United States Patent [19]

Yamada

[11] Patent Number: 4,978,978
[45] Date of Patent: Dec. 18, 1990

[54] PHOTOSENSITIVE MICROCAPSULE SHEET RECORDER WITH CRT IMAGE PROJECTION

[75] Inventor: Yasumasa Yamada, Tokyo, Japan
[73] Assignee: Seiko Instruments Inc., Japan
[21] Appl. No.: 276,228
[22] Filed: Nov. 23, 1988

[30] Foreign Application Priority Data

Nov. 27, 1987 [JP] Japan .................................. 62-299547
Nov. 28, 1987 [JP] Japan .................................. 62-300585

[51] Int. Cl.$^5$ .......................... G01D 15/14; G03C 1/72
[52] U.S. Cl. .................................. 346/110 R; 346/11; 430/138
[58] Field of Search ................. 346/110 R, 76 L, 108, 346/107 R, 1.1; 430/138, 211; 355/27; 354/297

[56] References Cited

U.S. PATENT DOCUMENTS 4,769,651 9/1988 Mayer .............................. 346/110 R
4,801,949 1/1989 Misano .............................. 346/76 L Primary Examiner—Mark J. Reinhart
Attorney, Agent, or Firm—Bruce L. Adams; Van C. Wilks

[57] ABSTRACT

An optical printing apparatus is provided for use in color printing systems wherein an image is projected by a fiber-optic faceplate CRT onto an imaging sheet which contains a layer of pressure rupturable capsules, each capsule encapsulating a photoreactive composition and a chromogenic material. The image is focused on a display screen of the fiber-optic faceplate CRT and transmitted through a plurality of optical fibers in parallel so that the image can be sharply focused on the imaging sheet. A scanning technique permits multiple exposures of the imaging sheet and results in the development of a color image having distinct color gradations.

15 Claims, 6 Drawing Sheets

PHOTOSENSITIVE MICROCAPSULE SHEET RECORDER WITH CRT IMAGE PROJECTION

BACKGROUND OF THE INVENTION

1. Field of the Invention

The present invention relates to a capsule rupture printing system for recording an image in an imaging sheet with a layer of subminiature capsules, and more particularly to a system comprising a cathode-ray tube which projects images or information to be recorded onto the imaging sheet.

2. Description of the Prior Art

A review of the prior art reveals a number of existing printing systems, namely; a thermotransferring printing system, an inkjet printing system and a xerography system.

The thermotransferring printing system selectively energizes plural heat generating elements which are disposed on a thermal head. Using the heat radiated from the selected heat generating elements, an ink on a surface of an ink sheet is melted. The ink is then transferred onto a sheet of recording paper for printing image and letter information.

In this system, a dot of ink corresponding to the area of one heat generating element adheres onto the sheet of recording paper and thereby producing one pixel. There are two methods for tone gradation printing according to this system: one is to repetitively print at one spot to change the density of a printed pixel; and the other is to change a printed area per unit area. However, using the former method is required in order a long time to obtain a tone gradation. According to the later method, the area of a pixel is large and therefore the quality of printed pixel is low. Furthermore, when full color printings are required, three printing processes for three different colors, cyan, magenta and yellow, are used in order to produce a color picture. As a result, there occurs a mis-superpose of colors in which three pictures of different colors are not perfectly superposed on top of the other. The result is that it takes a long time to produce a full color picture. The inkjet printing system has the same problems as those of the thermotransferring printing system.

Finally there is the xerography system, whereby an image or pattern is formed on a cylindrical sensitized or photoconductive drum whose outer surface is coated with a photoconductive material such as Se, ZnO, amorphous Si or an organic semiconductor. Areas on the outer surface of the photoconductive drum, which correspond to a desired image to be reproduced, are exposed to light, and electrostatically charged to form a latent image. The latent image is developed by using a toner, and the toner image is then transferred to paper. The xerography system described above is characterized by its capability of reproducing images at a comparatively high speed. However, since this system employs an optical system for producing the latent images on the photoconductive drum, it requires that the drum be made to extremely tight dimensional tolerances. Moreover, since the toner is always consumed, it is necessary to always store and supplement the toner. Accordingly, the cost of manufacturing the drum and the copying apparatus is considerably high. Further, the construction of the apparatus becomes complicated and the maintenance, thereof, troublesome.

In order to solve the above problems, imaging systems based on using a photosensitive sheet are known, F. W. Sanders et. al. U.S. Pat. Nos. 4,399,209 and 4,440,846 describes an imaging system wherein a photosensitive layer comprising microcapsules containing a photosensitive composition in the internal phase is image-wise exposed to actinic radiation and subjected to a uniform rupturing force whereupon the microcapsules rupture and image-wise release the internal phase. Image-forming agents such as substantially colorless chromogenic materials are typically associated with the microcapsules, so that when the microcapsules rupture, the chromogenic materials are able to image-wise react with a developer material and produce a color image. As the photosensitive composition encapsuled in microcapsules on the imaging sheet solidifies to varying degrees according to the amount of exposure to light, the amounts of chromogenic materials released from the capsules vary depending upon the degrees of exposure to the light. Consequently, a tone of the printed-out image can be changed. Isobe et. al. disclose in their Japanese laid-open Pat. No. 61-143738 a method to project an image displayed on a CRT display as shown in FIG. 7 onto an imaging sheet coated with the microcapsules, which is disposed adjacent to the display screen of the CRT display, and records its latent image on the imaging sheet. Unlike the xerography system, the Isobe system does not require a photoconductive drum for producing a latent image nor a toner, and therefore the apparatus can be manufactured at a low cost and in small size, and, of course, the maintenance for the drum and toner is not required. However, according to this system, light, emitted from a fluorescent material 16 coated on the inner face of a glass plate 17 composing a CRT display screen, pass through the glass plate 17, and then through a space between the CRT display screen and the imaging sheet, and reach the imaging sheet, and as a result, an image focused on the CRT display becomes out of focus on the imaging sheet.

SUMMARY OF THE INVENTION

An object of the present invention is to provide a printing system for producing high quality pictures, in which an image presented on a CRT display is clearly focused on an imaging sheet and recorded thereon.

Another object of the present invention is to provide a printing system in which a picture containing full color information is printed in one process, mis-superpose of color is prevented, and the print processing time is short.

Still another object of the present invention is to provide a printing system which can produce high quality monochromatic or color pictures having continuous tone gradation.

A further object of the present invention is to provide a printing system which does not require the maintenance nor consumables such as inks, toners, etc. thereby reducing the running cost.

Still a further object of the invention is to provide a small and highly reliable printing system having a simple structure.

Other and further objects, features and advantages of the invention will appear more fully from the following description.

DESCRIPTION OF THE PREFERRED EMBODIMENT

The present invention will be described with reference to the accompanying drawings.

Figure 1:
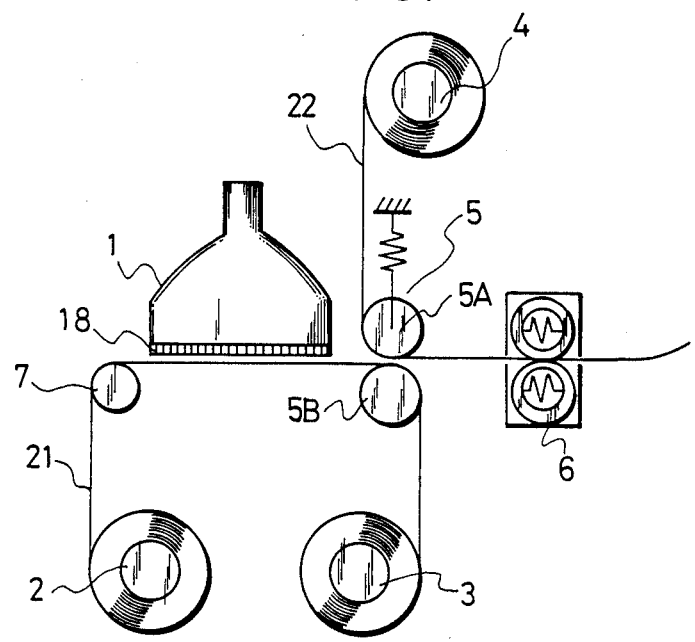
FIG. 1 is a schematic illustration of a printing system according to the present invention.
Figure 2:
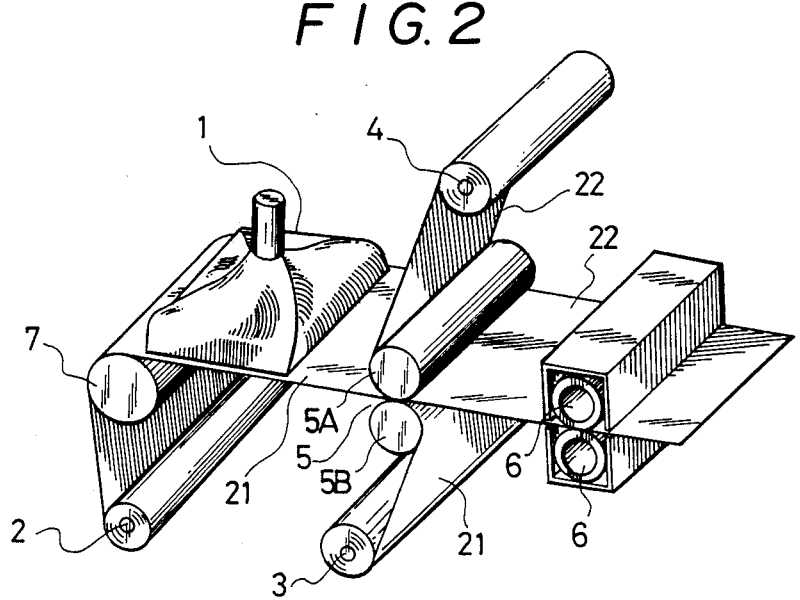
FIG. 2 is a schematic perspective illustration of a printing system according to the present invention.

FIG. 1 is a schematic illustration of one embodiment of a printing system according to the present invention. FIG. 2 is a schematic perspective illustration of the printing system. Reference numeral 1 designates a fiber-optic faceplate CRT which has its screen composed of a plurality of optical fibers 18, as shown in sectional block in FIG. 8 and has its fluorescent layer 16 coated with such a fluorescent material as will emit optical beams of wavelengths $\lambda_1$, $\lambda_2$ and $\lambda_3$ in response to the electron beam 19 coming from the electron gun in accordance with the image information, although not shown. Moreover, lights other than those coming from the fiber-optic faceplate CRT 1 are shielded to fail to reach an imaging sheet 21. Numeral 2 designates an imaging sheet supply reel, and the imaging sheet 21 leaving this imaging sheet supply reel 2 is extended under tension in parallel with the screen of the fiber-optic faceplate CRT 1 between a guide roller 7 and one roller 5B of a developing device 5. Numeral 3 designates an imaging sheet take-up reel for taking up the imaging sheet 21 having left the developing device 5. On the other hand, an image receiving sheet 22 is fed from an image receiving sheet supply reel 4 to pass over one roller 5A of the developing device 5 and a heat roller 6 fixing the image on the image receiving sheet 22. The developing device 5 evenly presses the face of the imaging sheet 21 coated with the microcapsules and the face of the image receiving sheet 22 coated with a developing material 24 between its two rollers 5A and 5B thereby to develop the imaging sheet 21. The heat roller 6 fixes the image, which has been developed on the image receiving sheet 22 by the developing device 5, on the image receiving sheet 22.

Figure 4:
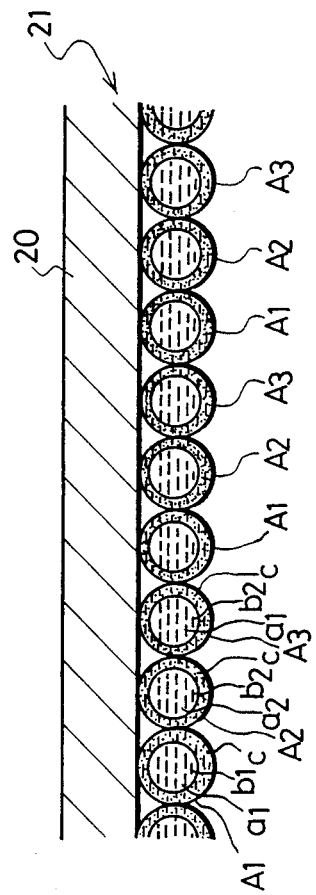
FIG. 4 is a sectional view of the imaging sheet having microcapsules coated on its surface to be used in a printing system of the present invention.
Figure 6:
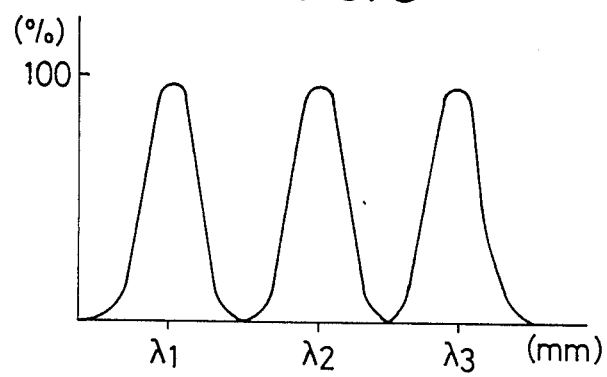
FIG. 6 is a diagram schematically showing the relation between the wavelengths of incident light and the sensitivity of the imaging sheet to be used in a printing system of the present invention.
Figure 7:
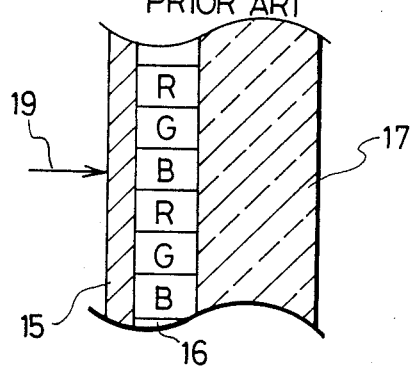
FIG. 7 is a sectional view schematically showing a CRT display screen of the prior art.

FIG. 4 shows a simplified structure of the imaging sheet 21 used in this invention. Reference symbols $A_1$, $A_2$, $A_3$ denote microcapsules presenting colors of cyan, magenta and yellow, respectively. Chromogenic materials $a_1$, $a_2$, $a_3$ which cyan, magenta and yellow, respectively, and photoreactive composition $b_1$, $b_2$, $b_3$ which immobilize the chromogenic materials by changing the viscosity etc. as a result of reactions to electro-magnetic beams of which wave-lengths $\lambda_1$, $\lambda_2$, $\lambda_3$ correspond to the colors of the chromogenic materials (see FIG. 6) such as light beams, are microcapsulated by surrounding thin films C made of gelatin etc. The microcapsules are coated evenly on the surface of the sheet 20 forming carrier so as to constitute the imaging sheet 21.

Figure 5:
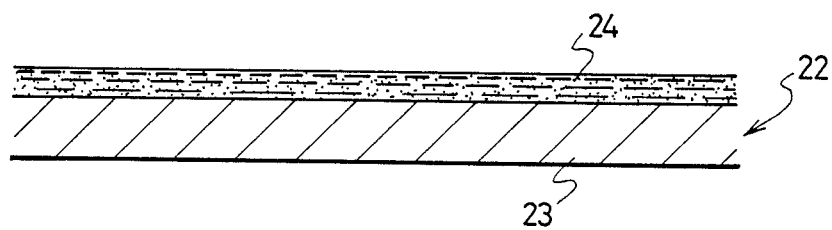
FIG. 5 is a sectional view of the image receiving sheet having a developer coated on its surface to be used in a printing system of the presents invention.

FIG. 5 shows a simplified structure of the image-receiving sheet 22. It is constituted by coating a developing material 24, which generates colors in response to the chromogenic materials $a_1$, $a_2$, $a_3$ on the surface of a sheet 23 forming a carrier.

When the above mentioned imaging sheet 21 is exposed to the light having the wave-lengths to which the reactive composition $b_1$, $b_2$, $b_3$, within microcapsules $A_1$, $A_2$, $A_3$ react, the viscosity of the photoreactive composition $b_1$, $b_2$, $b_3$ changes. In this manner, a latent image is formed on the imaging sheet 21. Then, the imaging sheet 21, thus exposed, is united with the image-receiving sheet 22 into one body and pressure is added to the united body so that the capsules $A_1$, $A_2$, $A_3$ are broken. As a result, there comes out a difference in the amount of the chromogenic materials flown out of the capsules between the capsules exposed to light and those unexposed. Consequently, colors corresponding to the wave lengths $\lambda_1$, $\lambda_2$, $\lambda_3$ of the projected light are presented on the image-receiving sheet 22. That is, color patterns in accordance with the patterns presented at the time of light projection can be obtained.

Figure 3:
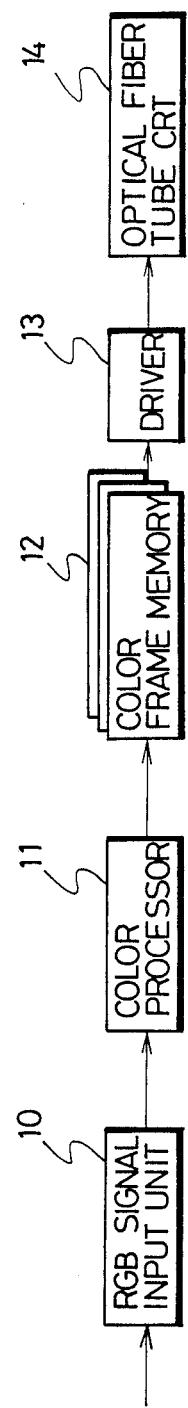
FIG. 3 is a block diagram of an image processing circuit used in a printing system of the present invention.

Next, the operations of the color printing apparatus will be described in the following with reference to the block diagram of the circuit shown in FIG. 3. Image information transmitted from an output of a video monitor is inputted into a RGB signal input unit 10. The RGB signal input unit 10 changes the image information into an easy signal to deal with therein and outputs it to a color processor 11. The color image information inputted from the RGB signal input unit 10 is divided into R, G and B color components by the color processor 11. The three signals having R, G and B color components are stored respectively as a frame of data in a color frame memory 12. After this, one frame of color separation data 31 (see FIG. 9) is inputted through a CRT driver 13 to the fiber-optic faceplate CRT 14.

It is also apparent that similar effects can be obtained from a color copying machine which outputs the color image from the color printer of the present invention by using the image signals prepared by separating the colors of an original copy document by the color scanner.

Figure 8:
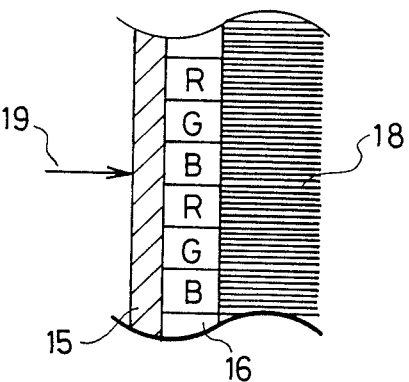
FIG. 8 is a sectional view schematically showing a display screen of the fiber-optic faceplate CRT to be used in the printing system of the present invention as shown in FIG. 1.

FIG. 8 is a sectional view schematically showing a display screen of the fiber-optic faceplate CRT 1. A fiber-optic faceplate comprising a plurality of optical fibers 18 is produced by the multiple fiber method, in which optical fibers are densely fused together without a separation to each other to form a plate. Fluorescent particles for red, green and blue colors are thinly coated on the inner face of a plurality of optical fibers 18, which forms a fluorescent layer 16. The fluorescent layer 16 emits light at levels corresponding to the intensity of incident electron beams 19 and displays a visible image. A metal back 15 composed of a thin aluminum film is deposited on the fluorescent layer 16. The metal back 15 serves as a reflection mirror to reflect light, emitted from the fluorescent layer 16 and then towards the interior of the CRT, toward viewers so as to make best use of the fluorescent light emission. When an incident electron beam 19 corresponding to an image is irradiated through the metal back 15 onto the fluorescent layer 16, fluorescent materials irradiated with the electron beam 19 are excited to a level corresponding to amount of the energy of the incident electron beam 19, and thereby emit an excitation energy in the form of light. Most of the radiating light emitted from the fluorescent materials is effectively transmitted by the plurality of optical fibers 18, and a latent image is directly recorded on the imaging sheet 21 disposed adjacently to the outer face of a plurality of optical fibers 18. Since an image focused on the fluorescent layer 16 advances through a plurality of optical fibers 18 in parallel, the image can be sharply focused on the imaging sheet 21.

A latent image composed of capsules cured and uncured depending on the exposure information is formed on the exposed imaging sheet or photosensitive sheet 21. This imaging sheet or photosensitive sheet 21 is sent to the developing device 5, in which it is pressed together with the image receiving sheet 22. Since, at this time, the photo-reactive composition $b_l$, $b_2$ and $b_3$ encapsulated in the respective microcapsules $A_l$, $A_2$ and $A_3$ on the imaging sheet 21 are cured in accordance with the amounts of exposure, the amounts of the chromogenic materials $a_l$, $a_2$ and $a_3$ to flow from the capsules $A_l$, $A_2$ and $A_3$ are different in accordance with the amounts of exposure. As a result, the chromogenic materials $a_l$, $a_2$ and $a_3$ according to the amounts of exposure will ooze into the image receiving sheet 22 from the imaging sheet or photosensitive sheet 21 at the portion pressed by the developing device 5. The image receiving sheet 22 having been developed by the developing device 5 is heated by the heat roller 6 so that the reactions between the chromogenic materials $a_l$, $a_2$ and $a_3$ and developing material 24 proceed quickly and are fixed to form a color image thus shortening the developing time.

Figure 9:
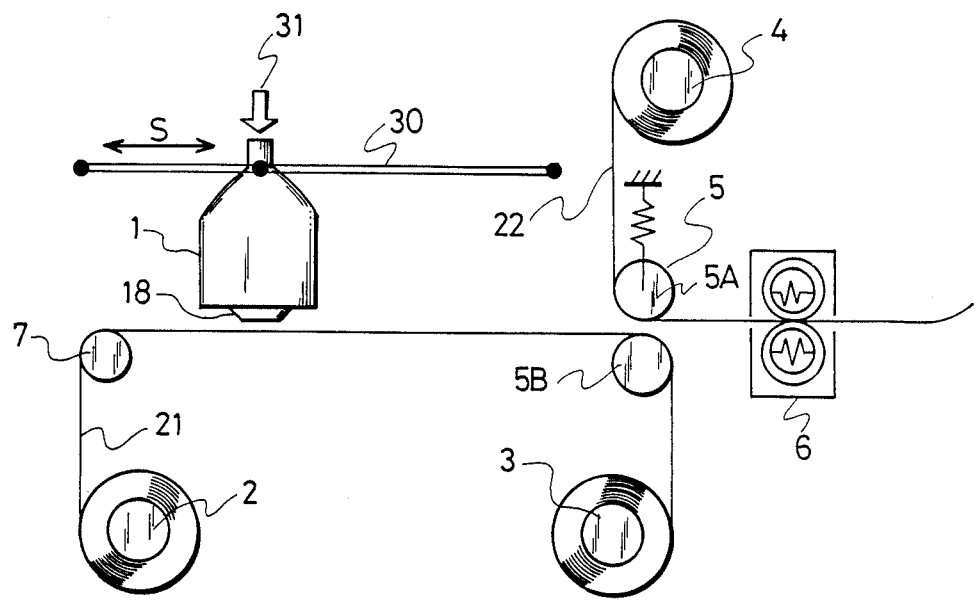
FIG. 9 schematically shows another embodiment of a printing system of the present invention.
Figure 10:
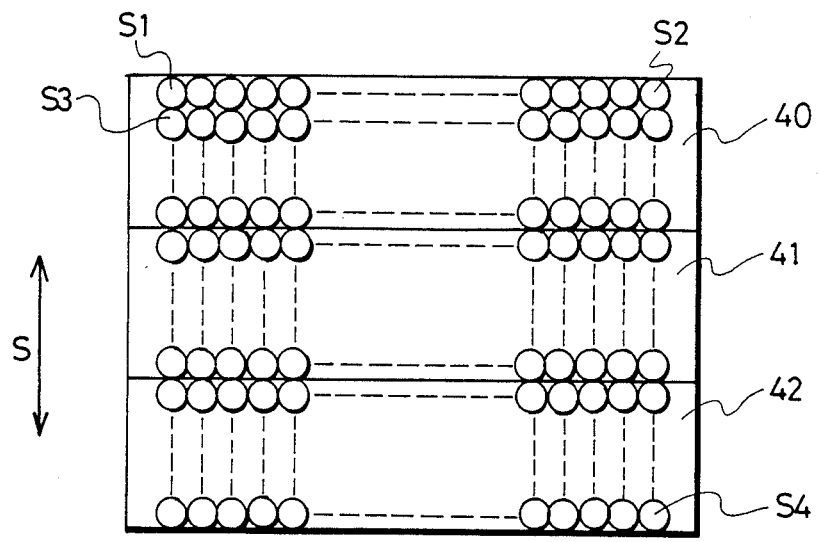
FIG. 10 is an elevational view schematically showing a display screen of a fiber-optic faceplate CRT to be used in the printing system of the present invention as shown in FIG. 9.
Figure 14:
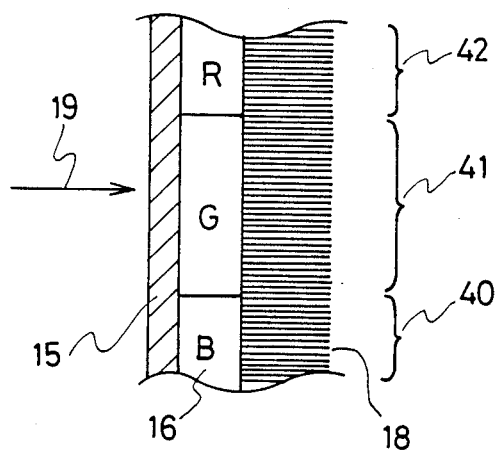
FIG. 14 is a sectional view schematically showing the display screen of the fiber-optic faceplate CRT as shown in FIG. 10.

FIG. 9 schematically shows another embodiment of a printing system of the present invention. A fiber-optic faceplate CRT or image projecting means 1 has a screen composed of a plurality of optical fibers 18, as shown in FIG. 14. The screen is divided into three beam regions normal to the moving direction (S) of the optical fibers 18, as shown in FIG. 10. Each of the beam regions 40, 41 and 42 is composed of a plurality of lines and has its fluorescent layer 16 coated with such a fluorescent material as will emit optical beams of wavelengths $\lambda_1$ (blue), $\lambda_2$ (green) and $\lambda_3$ (red). Numeral 30 designates a scanning unit for moving the fiber-optic faceplate CRT 1 in parallel with the imaging sheet or photosensitive sheet 21. Moreover, lights other than those coming from, fiber-optic faceplate CRT 1 are shielded to prevent them from reaching the imaging sheet 21. Numeral 2 designates an imaging sheet supply reel, and the imaging sheet 21 leaving this imaging sheet supply reel 2 is extended under tension in parallel with the screen of the fiber-optic faceplate CRT 1 between a guide roller 7 and one roller 5B of a developing device 5. Numeral 3 designates an imaging sheet take-up reel for taking up the imaging sheet or photosensitive sheet 21 having left the developing device 5. On the other hand, the image receiving sheet 22 is fed from an image receiving sheet supply reel 4 to pass over one roller 5A of the developing device 5 and a heat roller 6. The developing device 5 evenly presses the face of the imaging sheet 21 coated with the microcapsules and the face of the image receiving sheet 22 coated with the developing layer 24 between its two rollers 5A and 5B thereby to develop the imaging sheet 21. The heat roller 6 provides a means for fixing the image, which has been transferred on the image receiving sheet 22 by the developing device 5, on the image receiving sheet 22.

Next, the operations of the printing apparatus will be described in the following. An electron beam 19 which is emitted from the electron gun of the fiber-optic faceplate CRT 1 to bombar the fluorescent layer 16 applied to the screen of the fiber-optic faceplate CRT 1 to expose the imaging sheet 21 and form a latent image thereon. The electron beam scans a plurality of optical fibers 18 from a spot Sl to a spot S2 horizontally in its ON state as shown in FIG. 10 and returns horizontally to a spot S3 in its OFF state. The electron beam 19 repeats the scans to expose the imaging sheet 21 to the wavelength $\lambda_1$ for the region 40, to the wavelength $\lambda_2$ for the region 41 and to the wavelength $\lambda_3$ for the region 42. The electron beam terminates its scanning for one frame at a spot S4 and returns vertically to the spot Sl. During this vertical return from the spot S4 to the spot Sl, the fiber-optic faceplate CRT 1 is moved one dot line by the scanning unit 30. These operations are repeated to expose the imaging sheet 21 to one frame.

Figure 11:
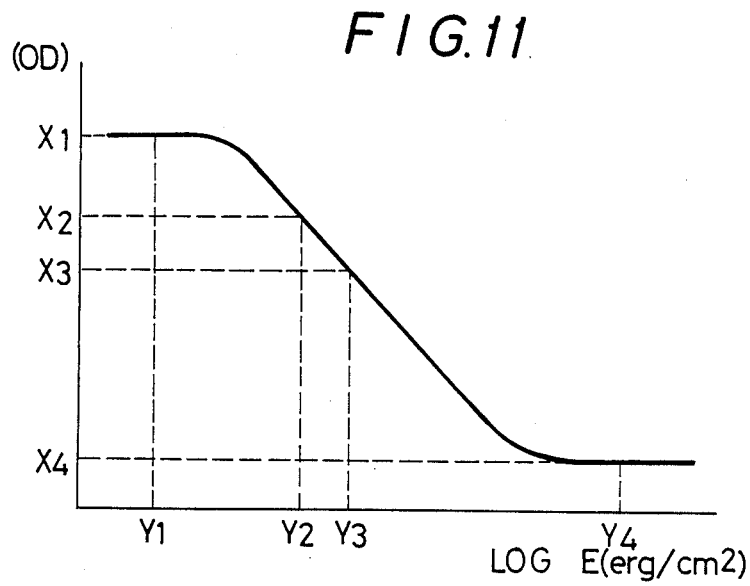
FIG. 11 is a diagram showing the relationship between the density of printed color and the amount of the exposure of the imaging sheet to be used in a printing system of the present invention.
Figure 12:
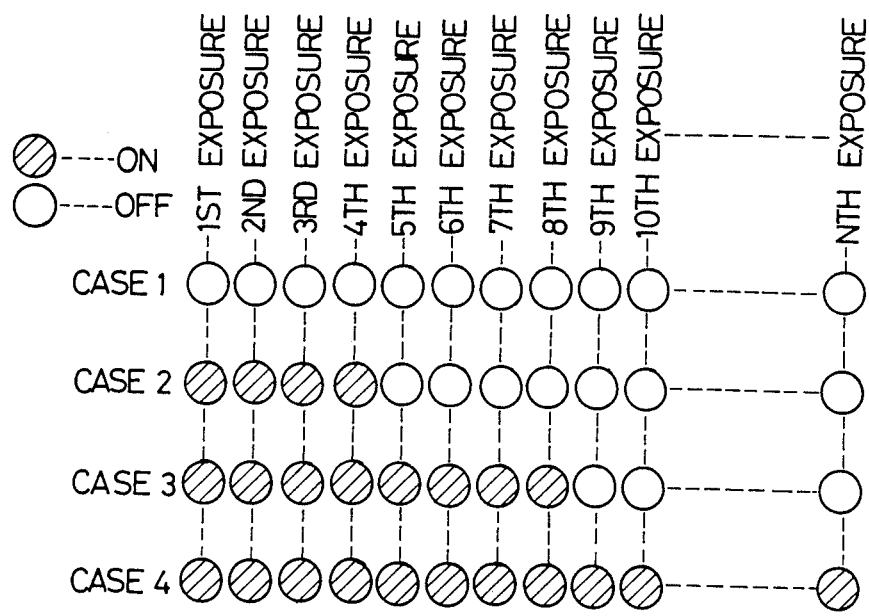
FIG. 12 is a diagram showing the relationship between the density of printed color and the number of exposures in the printing system of the present invention as shown in FIG. 9.

FIG. 11 is an explanatory diagram showing the relation between the density of the image sheet and the amount of exposure. The amount of exposure for a density $x_l$ is $y_l$, and the amount of exposure for a density $x_2$ is $y_2$. Moreover, the amount of exposure for a density $x_3$ is $y_3$, and the amount of exposure for a density $x_4$ is $y_4$. FIG. 12 is a schematic diagram showing the relationship between the density of printed color and the number of exposures in the printing apparatus. In case 1, the beam is OFF at all exposure timing for density $x_l$. In case 2, the beam is ON from the first to fourth exposures and OFF later for the density $x_2$. In case 3, the beam is ON from the first to eighth exposures and OFF later, for the density $x_3$. Thus, by controlling the beam in an state while scanning ON and OFF the number of scanning lines of the fiber-optic faceplate CRT 1 for one dot, the exposures can be controlled from $y_l$ to $y_4$ to express the densities from $x_l$ to $x_4$ so that multiple gradations can be expressed for one dot.

In the description thus far made, the first to fourth exposures are accomplished with the beam ON so as to attain the density $x_2$. In order to attain the density $x_3$, moreover, the first to eighth exposures are accomplished with the beam 0N. Since, however, the number of exposures required is determined by the sensitivity of the imaging sheet or photosensitive sheet 21, if the sensitivity of the imaging sheet 21 is improved the number of exposures can be reduced.

On the other hand, it is conceivable to control the beam ON and OFF by the number of the scanning lines and energy of electron beam 19. Then, more gradations can be expressed than those of the foregoing method.

A latent image composed of cured and uncured capsules is formed on the exposed imaging sheet or photosensitive sheet 21. This imaging sheet 21 is sent to the developing device 5, in which it is pressed together with the image receiving sheet 22 to form a visible image. Since, at this time, the photoreactive composition $b_1$, $b_2$ and $b_3$ encapsulated in the micro-capsules $A_1$, $A_2$ and $A_3$ on the imaging sheet 21 are immobilized in accordance with the amounts of exposure, the amounts of the chromogenic materials $a_1$, $a_2$ and $a_3$ to flow from the capsules $A_1$, $A_2$ and $A_3$ are different in accordance with the amounts of exposure. As a result, the chromogenic materials $a_1$, $a_2$ and $a_3$ according to the amounts of exposure will ooze into the image receiving sheet 22 from the imaging sheet 21 at the portion pressed by the developing device 5 for forming a visible image. The image receiving sheet 22 having been developed by the developing device 5 is heated by the heat roller 6 so that the reactions between the chromogenic materials $a_1$, $a_2$ and $a_3$ and the developing material 24 proceed quickly and are fixed to form a color image.

Figure 13:
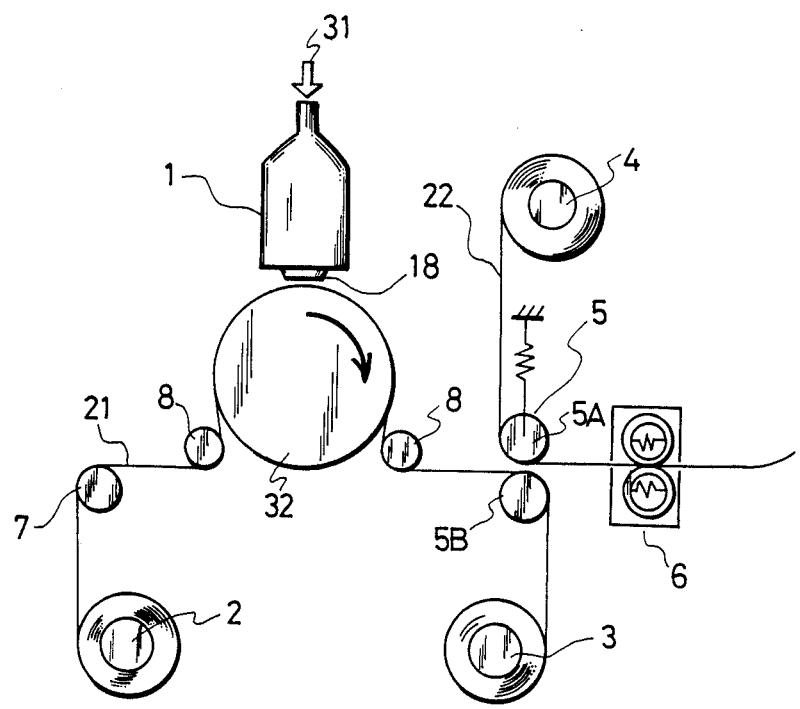
FIG. 13 schematically shows still another embodiment of a printing system of the present invention.

In the present embodiment, on the other hand, the exposures are effected by moving the fiber-optic faceplate CRT 1. As shown in FIG. 13, it is apparent that similar effects can be achieved even if the imaging sheet 21 is moved by a scanning drum 32 while the fiber-optic faceplate CRT 1 remains fixed.

The present embodiment thus far described is exemplified by the fluorescent layer 16 acting as the color developing source which is disposed at the end of the electron beam supply side of the fiber-optic faceplate CRT 1. Similar effects can be attained even if the fluorescent layer 16 is disposed at the end opposed to the electron beam supply side.

In the present embodiment, the image receiving sheet 22 is fed by unrolling the image receiving sheet supply reel. Similar effects can be attained even if the image receiving sheet is exemplified by the cut paper which is cut in advance to a size suitable for the color recording.

In the present embodiment shown in FIG. 9, the movement of the fiber-optic faceplate CRT is effected by intermittent operations. Similar effects can be attained by a relative movement at a constant speed.

On the other hand, the present invention can express multiple gradations for one dot. However, a binary image output for expressing an image with the densities $x_1$ and $x_4$ can be effected by using an area gradation in dependence upon the amounts of exposure $y_1$ and $y_4$.

As has been described hereinbefore, according to the present invention, the color image is recorded by using the fixed fiber-optic faceplate CRT. Thus, the imaging sheet or photosensitive sheet can be focused to record color image of high quality within a short time. Neither ink nor toner is required as supplies so that the running cost is dropped. Because of simplicity of structure, it is possible to realize a highly reliable apparatus having a small size. A color image of high quality of multiple gradations for one dot can be printed without mis-superpose of color.

What is claimed is:

1. An apparatus for forming an image on an image receiving sheet, comprising:
    a photosensitive sheet coated with microcapsules encapsulating therein a photo-reactive composition and a chromogenic material
    image processing means for producing processed image signals;
    image projecting means for projecting an image corresponding to the processed image signals from said image processing means onto said photosensitive sheet to thereby form a latent image on said photosensitive sheet, said image projecting means being disposed in facing relation with the surface of said photosensitive sheet and comprising a cathode-ray tube having a display screen of multiple optical fibers divided into a plurality of regions in accordance with wavelengths emitted from said display screen each of the regions of said display screen having a plurality of scanning lines so that a spot on the surface of said photosensitive sheet is exposed selectively from zero to a plurality of times corresponding to the maximum number of said scanning lines;
    means for effecting relative movement between said photosensitive sheet and said image projecting means;
    an image receiving sheet having a developer layer thereon; and
    developing means for superposing the exposed photosensitive sheet and said image receiving sheet on each other, and applying a pressure to said photosensitive sheet and said image receiving sheet toward each other, thereby developing said latent image into a visible image on said image receiving sheet.

2. An apparatus according to claim 1, wherein the image projecting means includes means for exposing a spot on the surface of said photosensitive sheet selectively from zero to a plurality of times corresponding to the maximum number of said scanning lines while modulating the luminance at each time.

3. An apparatus for forming a latent image on a photosensitive sheet and developing the latent image to form a visible image, comprising: a fiber-optic faceplate comprised of a plurality of groups of optical fibers arranged in a predetermined pattern, and means for transmitting an optical image through the pattern of optical fiber groups onto a photosensitive sheet to form a latent image thereon including means for selectively varying the number of times the parts of the optical image are transmitted through respective optical fiber groups to control the tone gradation of the latent image; and means for developing the latent image to form a visible image.

4. An apparatus according to claim 3; wherein the means for transmitting comprises means for transmitting different parts of the optical image through different ones of the optical fiber groups, and means for selectively varying the number of times each optical image part is transmitted through its respective optical fiber group to thereby control the tone gradation of the latent image.

5. An apparatus according to claim 3; wherein the transmitting means includes means for repeatedly scanning the optical image through the optical fiber groups so that different parts of the optical image are selectively transmitted through different ones of the optical fiber groups from zero to a plurality of times to thereby control the tone gradation of the latent image.

6. An apparatus according to claim 5; including means for displacing the fiber-optic faceplate relative to the photosensitive sheet in synchronization with the scanning of the optical image.

7. An apparatus according to claim 5; wherein the optical fiber groups are arranged in a plurality of successive regions with respect to the direction of scanning, each region corresponding to a different wavelength of light transmitted through the fiber-optic faceplate and having a plurality of rows of optical fiber groups.

8. An apparatus according to claim 5; including in combination therewith a photosensitive sheet comprised of rupturable microcapsules encapsulating therein a photoreactive composition and a chromogenic material, the photoreactive composition being responsive to the amount of optical energy received thereon from the fiber-optic faceplate to accordingly control the amount of chromogenic material released from the microcapsules when the same are ruptured; and wherein the means for developing comprises means for rupturing the microcapsules to release therefrom the chromogenic material to enable the same to form a visible image on an image-receiving sheet.

9. An apparatus according to claim 8; wherein the microcapsules contain chromogenic material of three different colors to form a visible color image on the image-receiving sheet.

10. An apparatus according to claim 3; including means for producing electrical image signals representative of an optical image; and wherein the fiber-optic faceplate includes electrically excitable light-emitting means optically coupled to one of the ends of the optical fiber groups and responsive to the image signals for emitting an optical image and transmitting the same through the optical fiber groups to the photosensitive sheet.

11. A method of forming a latent image on a photosensitive sheet and developing the latent image to form a visible image, comprising the steps of:
transmitting different parts of an optical image through different groups of optical fibers to form a latent image on a photosensitive sheet;
selectively varying the number of times each optical image part is transmitted through its respective optical fiber group to thereby control the tone gradation of the latent image; and developing the latent image to form a visible image.

12. A method according to claim 11; wherein the step of selectively varying comprises selectively varying the number of times each optical image part is transmitted through its respective optical fiber group from zero to a plurality of times.

13. A method according to claim 11; wherein the transmitting and selectively varying steps comprise repeatedly scanning the optical image through the optical fiber groups so that different parts of the optical image are selectively transmitted through different ones of the optical fiber groups from zero to a plurality of times to thereby control the tone gradation of the latent image.

14. A method according to claim 13; including displacing the optical fiber groups relative to the photosensitive sheet in synchronization with the scanning of the optical image.

15. A method according to claim 11; including arranging the optical fiber groups into three regions; and step of transmitting comprises transmitting different parts of the optical image at different wavelenghts through the optical fiber groups in each of the three regions.

* * * * *